United States Patent [19]

Tanaka et al.

[11] Patent Number: 4,885,750
[45] Date of Patent: Dec. 5, 1989

[54] METHOD AND APPARATUS FOR ERROR CORRECTION

[75] Inventors: Koji Tanaka; Kazunori Nishikawa, both of Tokyo; Kazuya Yamada, Yokosuka, all of Japan

[73] Assignee: Victor Company of Japan, Ltd., Yokohama, Japan

[21] Appl. No.: 156,511

[22] Filed: Feb. 16, 1988

[30] Foreign Application Priority Data

Feb. 14, 1987 [JP] Japan .................................. 62-32153

[51] Int. Cl.$^4$ ............................................. G06F 11/10
[52] U.S. Cl. ................................................... 371/37.4
[58] Field of Search .............................. 371/38, 39, 40

[56] References Cited

U.S. PATENT DOCUMENTS

| 4,175,692 | 11/1979 | Watanabe | 371/13 |
| 4,359,771 | 11/1982 | Johnson et al. | 371/13 |
| 4,712,216 | 12/1987 | Glaise | 371/38 |
| 4,788,685 | 11/1988 | Sako et al. | 371/38 |

FOREIGN PATENT DOCUMENTS

| 55-147052 | 11/1980 | Japan . |
| 58-56209 | 4/1983 | Japan . |
| 60-130947 | 7/1985 | Japan . |
| 1253433 | 11/1971 | United Kingdom . |
| 2038145 | 7/1980 | United Kingdom . |
| 2101853 | 1/1983 | United Kingdom . |

Primary Examiner—Charles E. Atkinson
Attorney, Agent, or Firm—Pollock, Vande Sande & Priddy

[57] ABSTRACT

A digital signal has frames each composed of n data words and a parity code. One data word has m bits. The letters n and m represent natural numbers equal to or greater than 2. One frame of data words is written into a memory. When writing of one frame of the data words into the memory is completed, a write end flag is generated and written in the memory. After the detection of the write end flag, the data words are read out from the memory. An error is detected from the read data words and is corrected.

2 Claims, 6 Drawing Sheets

METHOD AND APPARATUS FOR ERROR CORRECTION

BACKGROUND OF THE INVENTION

This invention relates to a method and an apparatus for error correction in digital signals.

In some formats, digital signals have frames each composed of data words and parity codes. During record and reproduction of such digital signals, the digital signals are written into and read out from a memory in unit of a frame. Error correction is performed on the reproduced digital signals by use of the parity codes. In a method of error correction using syndrome calculation, it is usual to write a certain quantity of input data into a memory before the start of syndrome calculation.

The time necessary for syndrome calculation and error correction of one-frame data is much shorter than the time necessary for the transfer of one-frame input data. Known error correction apparatuses generally include a timing control circuit to compensate such a difference between the necessary times.

SUMMARY OF THE INVENTION

It is an object of this invention to provide reliable method and apparatus for error correction.

It is another object of this invention to provide simple method and apparatus for error correction.

In a method and an apparatus for error correction according to this invention, a digital signal has frames each composed of n data words and a parity code. One data word has m bits. The letters n and m represent natural numbers equal to or greater than 2. One frame of data words is written into a memory. When writing of one frame of the data words into the memory is completed, a write end flag is generated and written in the memory. After the detection of the write end flag, the data words are read out from the memory. An error is detected from the read data words and is corrected.

DESCRIPTION OF THE PREFERRED EMBODIMENT

This invention can be applied to digital signals in various formats. One example of the digital signal formats used in this invention will be described hereinafter, which is applied to a reproduction system of digital audio signals recorded and reproduced together with a video signal.

Figure 1:
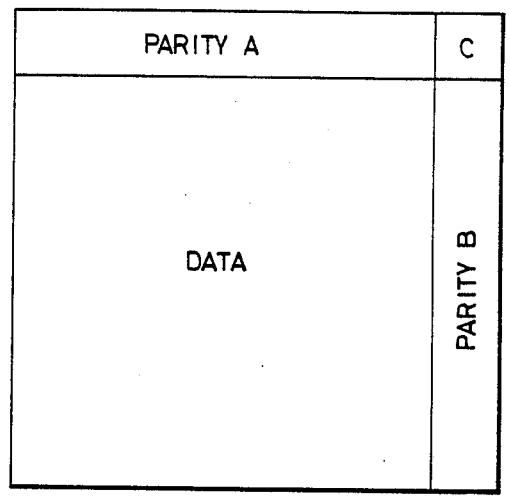
FIG. 1 is a diagram of a format of a digital signal in this invention.

A unit consists of m-bits, where the letter m represents a natural number equal to or greater than 2. A digital signal composed of a unit corresponds to one word. A frame has n-words of data, and parity codes, where the letter n represents a natural number equal to or greater than 2. One large block consists of K-frames, where the letter K represents a natural number equal to or greater than 2. As shown in FIG. 1, one large block is in a two dimensional arrangement of product codes, having data and parities A, B, and C. The parities A and B are used in error correction of data. The parities C are used in error correction of parities A. The parities A and B extend along a horizontal direction and a vertical direction respectively.

Figure 2:
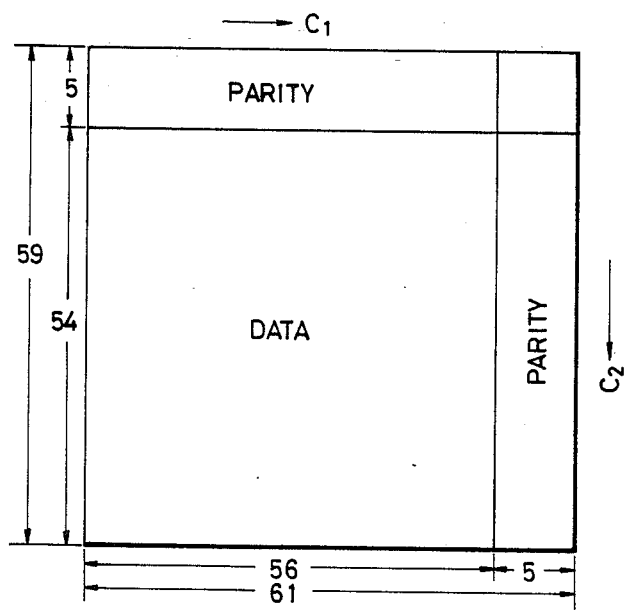
FIG. 2 is a diagram of a format of a digital signal in this invention.
Figure 3:
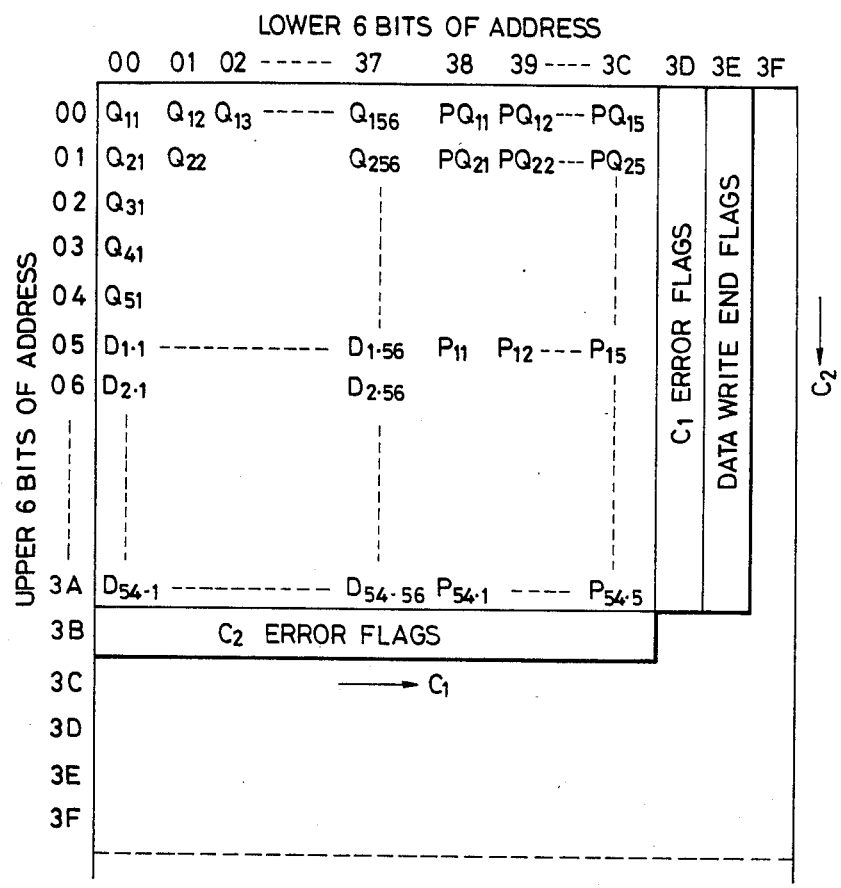
FIG. 3 is a diagram of a format of a digital signal with addresses in this invention.

In cases where one large block has a dimension (61,56) in a C1 direction and a dimension (59,54) in a C2 direction as shown in FIG. 2, when the large block is assigned to a memory, addresses are given in hexadecimal notation as shown in FIG. 3 and some segments of the memory are unused. In FIG. 3, the letters P denote parities in the C1 direction and the letters Q denote parities in the C2 direction. In addition, the characters PQ denote other parities (parities P generated from the parities Q) and the letters D denote information data.

Figure 4:
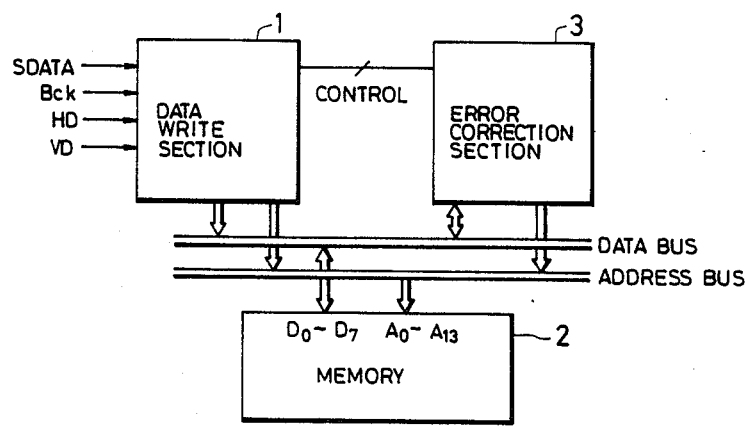
FIG. 4 is a block diagram of an error correction apparatus according to an embodiment of this invention.

FIG. 4 shows an error correction apparatus according to this invention. As shown in FIG. 4, a data write section 1, a memory 2, and an error correction section 3 are mutually connected via a data bus and an address bus. Serial data SDATA, bit clocks Bck, and a horizontal sync signal HD and a vertical sync signal VD of a video signal are applied to the data write section 1. A control signal is outputted from the data write section 1 to the error correction section 3.

A reproduced RF signal in a reproducing device such as a video tape recorder is converted into a corresponding digital signal, which is separated into data components and clock components forming the serial data SDATA and the bit clocks Bck respectively.

Figure 6:
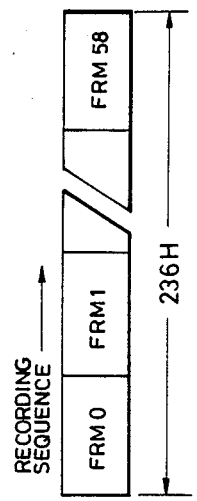
FIG. 6 is a diagram of a format of a digital signal used during transmission.
Figure 7:
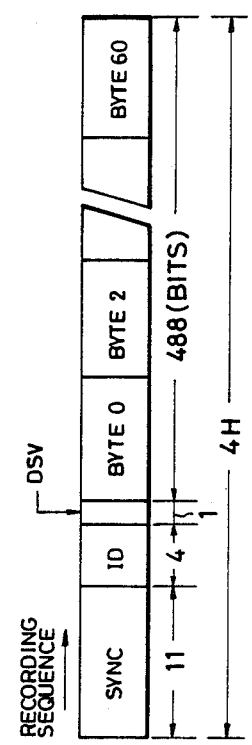
FIG. 7 is a diagram of internal format of signal blocks of FIG. 6.
Figure 8:
FIG. 8 is a timing diagram of a video signal and a data signal.

One block of the data including the paraties is divided into 59 frames FRM0 through FRM58, each of which is added with a header including a sync signal SYNC having a predetermined bit pattern, an identification signal representing contents of the program, a pre-emphasis constant etc., and a digital sum value control bit DSC for reducing a dc component and low-frequency components in the transmitted digital signals, as shown in FIGS. 6 and 7. And the data including the paraties are transmitted frame by frame in synchronism with every fourth horizontal sync pulse of the video signal.

When the data write section 1 has written one-frame data words into the memory 2, the write section 1 generates a write end flag which is written into a segment of the memory 2 having a location corresponding to an address (003E) as shown in FIG. 3. Similar processes are sequentially performed in respect of respective frames of subsequent data words. The generated write end flags are sequentially written into segments of the memory 2 corresponding to addresses (003E, 013E, . . . , 393E, 3A3E) as shown in FIG. 3.

When the error correction section 3 is activated by a power supply, the error correction section 3 performs an initialization process. During the initialization process, the error correction section 3 clears the segments of the memory 2 storing the data write end flags, that is, initializes the variables representing the data write ends. After the initialization process, the error correction section 3 waits for a first data write end flag which is generated from the data write section 1 upon the completion of writing of a first frame of data words into the memory 2. It should be noted that the first data write end flag is written into the segment of the memory 2 corresponding to the address (003E) as shown in FIG. 3.

Under conditions where the writing of the first frame of data words into the memory 2 has been completed so that the first data write end flag is generated, when the error correction section 3 confirms the generation of the first data write end flag, the error correction section 3 starts a syndrome calculation process, an error detection process, and an error correction process in respect of the first frame of data words. When all of these processes are completed, the error correction section 3 clears the write end flag related to the first frame of data words and increments the contents of an address counter corresponding to the upper 6 bits. Then, the error correction section 3 waits a second data write end flag representing the completion of writing of a second frame of data words into the memory 2. When the error correction section 3 confirms the generation of the second data write end flag, the error correction section 3 starts a syndrome calculation process, an error detection process, and an error correction process in respect of the second frame of data words. When all of these processes are completed, the error correction section 3 clears the write end flag related to the second frame of data words and increments the contents of the address counter corresponding to the upper 6 bits. Then, the error correction section 3 waits a third data write end flag representing the completion of writing of a third frame of data words into the memory 2.

Figure 5:
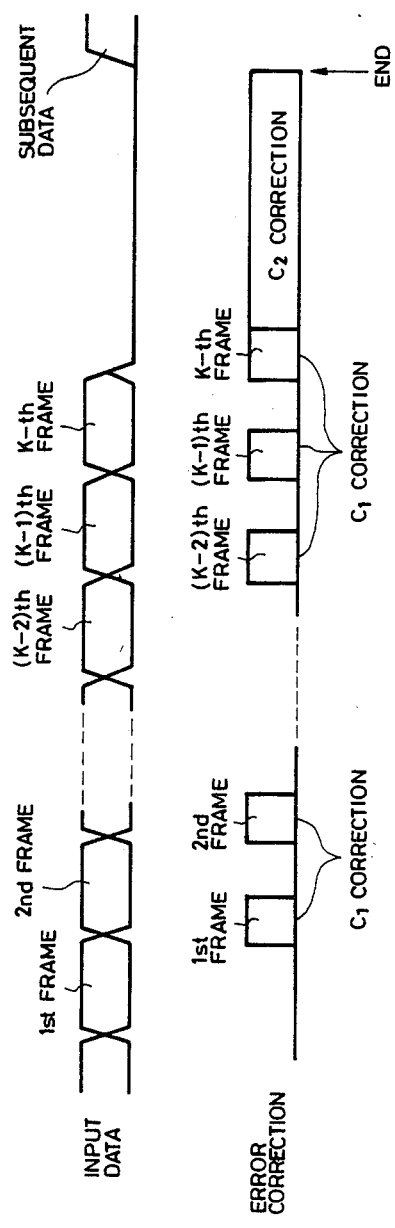
FIG. 5 is a timing diagram of data input and error correction in the error correction apparatus of FIG. 4.

The error correction section 3 operates on the third and following frames of data words in a manner similar to the previously-mentioned operations on the first and second frames of data words. In this way, as shown in FIG. 5, each time one frame of data words has been written into the memory 2 and the error correction section 3 confirms a related write end flag, the error correction section 3 starts a syndrome calculation process, an error detection process, and an error correction process in respect of the frame of data words. Accordingly, an overhead time until the start of error correction can be shortened so that a time usable for the error correction can be extended.

In the case of a signal format of FIG. 3, data located in a region surrounded by the lower 6 bits 0–3C and the upper 6 bits 0–3A are sequentially transferred in a series of frames FRM0–FRM58. For example, each time one line of data extending along the C1 direction has been transferred, an error correction process is started.

Figure 9:
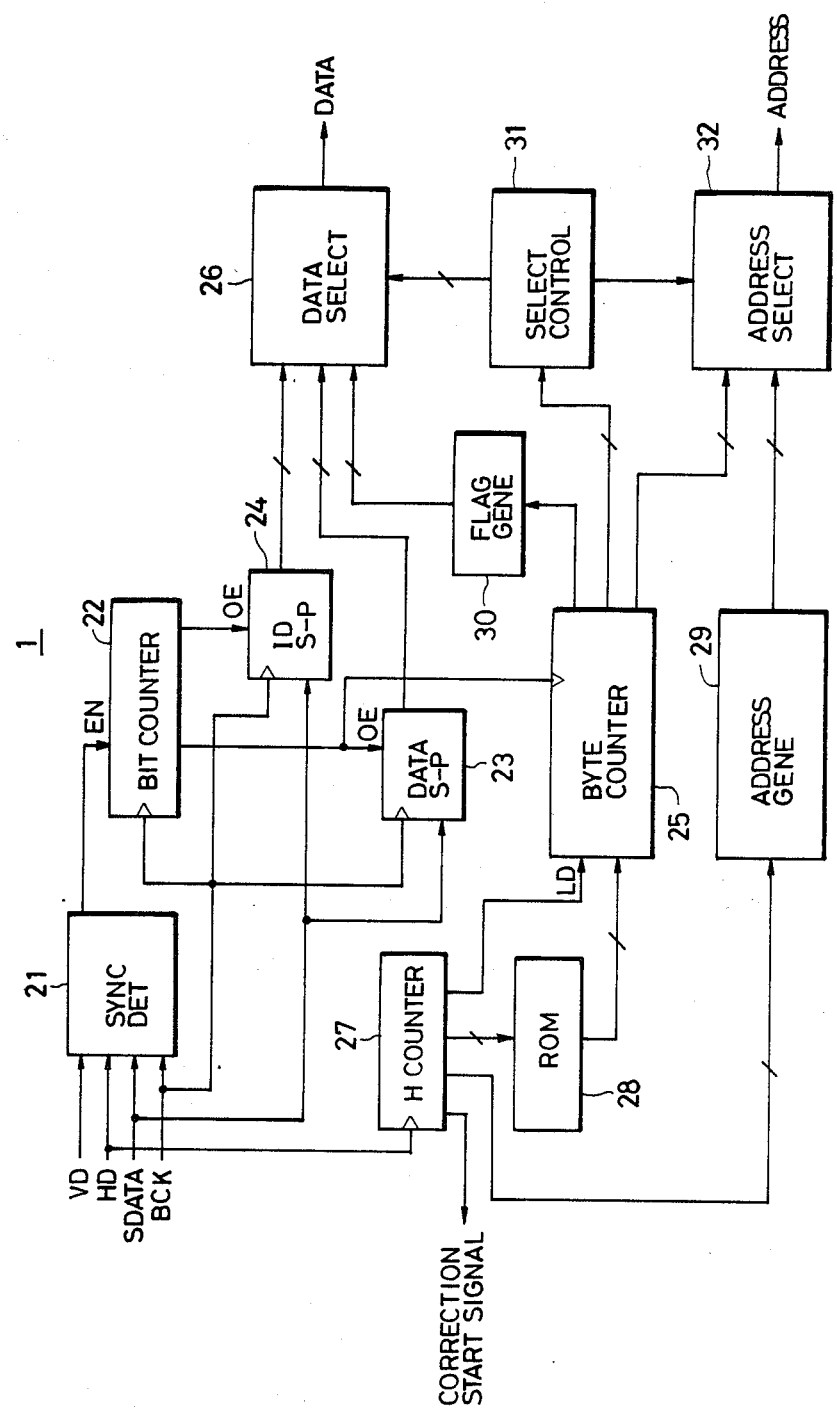
FIG. 9 is a block diagram of the data write section of FIG. 4.

As shown in FIG. 9, the data write section 1 includes a sync detector 21 receiving the serial data SDATA, the serial bit clocks Bck, the horizontal sync signal HD, and the vertical sync signal VD. The device 21 detects a sync component form the input data and outputs an H level voltage to an enable terminal EN of a bit counter 22 upon the detection of the sync component. The bit counter 22 outputs output enable signal and a clock to serial-to-parallel (S-P) converters 23 and 24, and a byte counter 25 in response to the pulse from the sync detector 21. The serial data SDATA are applied to the S-P converter 23. When the S-P converter 23 receives the start clock from the bit counter 22, the S-P converter 23 starts to convert data components Byte0–Byte60 of the signal SDATA into corresponding parallel data which are applied to a data selector 26. The serial data SDATA are also applied to the S-P converter 24. When the S-P converter 24 receives the output enable signal from the bit counter 22, the S-P converter 24 starts to convert an identification component ID of the signal SDATA into corresponding parallel ID data which are applied to the data selector 26.

A counter 27 outputs control signals to a ROM 28 and an address generator 29 in accordance with horizontal sync pulses HD. The ROM 28 outputs address data to the byte counter 25, allowing a start address of the byte counter 25 to be loaded to correspond to a horizontal sync pulse HD. Since the transferred serial data SDATA and the video signal are synchronous, the start address of the byte counter 25 is loaded upon the detection of the sync component SYNC of the serial data SDATA. The byte counter 25 outputs control signals to a flag generator 30 and a selector control circuit 31. The byte counter 25 outputs an address signal to an address selector 32. The address generator 29 also outputs an address signal to the address selector 32.

When the flag generator 30 receives a control clock from the byte counter 25, it generates a data write end flag which is applied to the data selector 26. The device 26 selects one of the signals from the devices 23, 24, and 30 and outputs the selected signal to the data bus (see FIG. 4) in accordance with a selection signal supplied from the selector control circuit 31. The device 32 selects one of the addresses from the devices 25 and 29 and outputs the selected address to the address bus (see FIG. 4) in accordance with a selection signal supplied from the selector control circuit 31.

After the sync component SYNC of the serial data SDATA is detected by the sync detector 21, the subsequent identification component ID of the serial data SDATA is changed by the S-P converter 24 into corresponding parallel identification data. The address generator 29 outputs an address corresponding to the parallel identification data. The parallel identification data and the corresponding address are selected and outputted from the selectors 26 and 32. Then, the data components Byte0–Byte60 of the serial data SDATA are changed by the S-P converter 23 into corresponding parallel data. The byte counter 25 generates addresses corresponding to the parallel data outputted from the S-P converter 23. The parallel data and the corresponding addresses generated by the devices 23 and 25 are selected and outputted from the selectors 26 and 32. Finally, the byte counter 25 outputs a control clock to the flag generator 30 so that the device 30 generates a data write end flag. Simultaneously, the byte counter 25 generates an address corresponding to the data write end flag. The data write end flag and the corresponding address are selected and outputted from the selectors 26 and 32.

Figure 10:
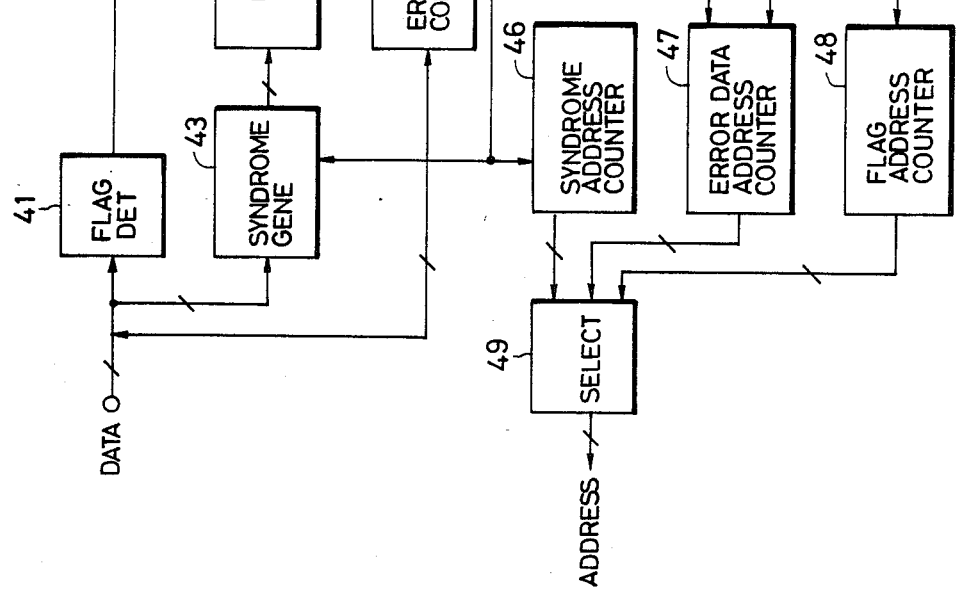
FIG. 10 is a block diagram of the error correction section of FIG. 4.

As shown in FIG. 10, the error correction section 3 includes a flag detector 41, which outputs control signals to a timing generator 42 and a syndrome generator 43 when it detects a data write end flag from the input data supplied via the data bus (see FIG. 4). A correction start signal, which is supplied from the counter 27 of the data write section, is applied to the timing generator 42. The device 43 generates syndromes with respect to the input data. The generated syndromes are fed to an error detector 44. The syndrome generator 43 and a syndrome address counter 46 are connected and are supplied with timing pulses from the timing generator 43. The error detector 44 outputs control signals to the timing generator 42 and an error corrector 45 when it detects an error. The device 45 corrects errors in the input data in response to the signal from the error detector 44. The error corrector 45 output a control signal to an error data address counter 47. A flag address counter 48 receives timing pulses from the timing generator 42. The address counters 46-48 output respective addresses to a selector 49. The device 49 selects one of the input addresses and outputs the selected address to the address bus (see FIG. 4).

When a correction start signal is inputted into the timing generator 42, an address corresponding to a data write end flag (see FIG. 3) is generated by the address counter 48 and the generated address is outputted via the selector 49 so that data corresponding to the generated address are transferred from the memory 2 (see FIG. 4) to the error correction section 3. The error correction section 3 periodically continues similar operation until the data has a bit formation equal to a bit formation of the end flag. When an end flag corresponding to one line has been detected, an error detection process and an error correction process are started. Specifically, when an end flag is detected, the flag detector 41 outputs a control pulse to the timing generator 42. Upon the receipt of the control pulse form the flag detector 41, the timing generator 42 starts the syndrome address counter 46 so that the counter 46 generates addresses corresponding to data in one line which are outputted via the selector 49. Accordingly, the data corresponding to the generated addresses are inputted from the memory 2 (see FIG. 4) into the error correction section 3 and syndromes with respect to the input data are generated by the device 43. A number of errors is determined in accordance with the generated syndromes. In the absence of an error, the timing generator 42 outputs a timing signal to the flag address counter 48, setting an address of a subsequent end flag. In the presence of an error or errors, the error or errors are corrected by the combination of the devices 44, 45, and 47. When error correction is completed, the timing generator 42 outputs a timing signal to the flag address counter 48 so that an address of a subsequent end flag is set.

What is claimed is:

1. An apparatus for correcting errors in a digital signal, the digital signal having frames each composed of n data words and a parity code, one data word having m bits, the letters n and m representing natural numbers equal to or greater than 2, the apparatus comprising:
   (a) a memory;
   (b) means for writing one frame of data words into the memory;
   (c) means for writing a write end flag into the memory when writing of one frame of the data words into the memory is completed;
   (d) means for detecting the write end flag written in the memory;
   (e) means for, after the detection of the write end flag, reading out the data words from the memory; and
   (f) means for detecting an error from the read data words and correcting the error.

2. A method of correcting errors in a digital signal, the digital signal having frames each composed of n data words and a parity code, one data word having m bits, the letters n and m representing natural numbers equal to or greater than 2, the method comprising the steps of:
   (a) storing one frame of data words;
   (b) storing a write end flag when storing of one frame of the data words is completed;
   (c) detecting the stored write end flag;
   (d) after the detection of the stored write end flag, reading out the stored data words; and
   (e) detecting an error from the read data words and correcting the error.

* * * * *